(12) United States Patent
van Klooster et al.

(10) Patent No.: US 9,134,157 B2
(45) Date of Patent: Sep. 15, 2015

(54) ULTRASONIC TRANSDUCER

(71) Applicant: Krohne AG, Basel (CH)

(72) Inventors: Jeroen Martin van Klooster, Tiel (NL); Arie Huijzer, Sliedrecht (NL)

(73) Assignee: Krohne AG, Basel (CH)

( * ) Notice: Subject to any disclaimer, the term of this patent is extended or adjusted under 35 U.S.C. 154(b) by 82 days.

(21) Appl. No.: 14/165,985

(22) Filed: Jan. 28, 2014

(65) Prior Publication Data

US 2014/0208866 A1 Jul. 31, 2014

(30) Foreign Application Priority Data

Jan. 28, 2013 (DE) .......................... 10 2013 001 354

(51) Int. Cl.
*G01F 1/66* (2006.01)
*G01F 15/18* (2006.01)

(52) U.S. Cl.
CPC ................ *G01F 1/662* (2013.01); *G01F 1/667* (2013.01); *G01F 15/18* (2013.01)

(58) Field of Classification Search
CPC ..................................... G01F 1/20; G01F 1/66
USPC .......................................... 73/861.18, 861.28
See application file for complete search history.

(56) References Cited

U.S. PATENT DOCUMENTS

| | | | | |
|---|---|---|---|---|
| 3,771,117 | A * | 11/1973 | Shaffer et al. .................. | 367/165 |
| 8,534,138 | B2 * | 9/2013 | Gottlieb et al. ............. | 73/861.28 |
| 8,544,343 | B2 * | 10/2013 | Gottlieb et al. ............. | 73/861.28 |
| 8,899,116 | B2 * | 12/2014 | Ueberschlag et al. ..... | 73/861.18 |
| 2007/0103035 | A1 | 5/2007 | Umina | |
| 2013/0192386 | A1 | 8/2013 | Ueberschlag et al. | |
| 2013/0219707 | A1 | 8/2013 | Sui et al. | |

FOREIGN PATENT DOCUMENTS

| | | |
|---|---|---|
| DE | 198 12 458 A1 | 10/1999 |
| EP | 0408148 A1 | 1/1991 |

* cited by examiner

*Primary Examiner* — Jewel V Thompson
(74) *Attorney, Agent, or Firm* — Roberts Mlotkowski Safran & Cole, P.C.; David S. Safran

(57) ABSTRACT

An ultrasonic transducer has a transducer housing having an ultrasound window, a housing tube and a housing flange, a transducer holder for holding the transducer housing, a transducer element with an ultrasonic flow rate measuring transducer that is positioned at an end of the housing tube of the transducer, and an opposing flange clamping the housing flange of the transducer housing to a holder flange of the transducer holder together with retraining screws and lock nuts. A side of the housing flange of the transducer housing facing the opposing flange has an outer contour which enables bracing of the opposing flange against the housing flange without tilting or bending of the housing flange.

5 Claims, 5 Drawing Sheets

ULTRASONIC TRANSDUCER

BACKGROUND OF THE INVENTION

1. Field of the Invention

The invention relates to an ultrasonic transducer as an important part of an ultrasonic flow meter, with a transducer housing and a transducer element, the transducer housing having an ultrasound window, a housing tube and a housing flange, and there being a transducer element either on the end of the housing tube facing the medium whose flow rate is to be measured or on the end of the housing tube facing away from the medium whose flow rate is to be measured, and the ultrasonic transducer having to be attached to a transducer holder using the housing flange, and for this purpose, the housing flange of the transducer housing has to be clamped between a holder flange of the transducer holder and an opposing flange using retraining screws and lock nuts.

2. Description of Related Art

Measurement, control and automation engineering are of special importance in industry. This applies especially to measurement engineering which is the basis for control and automation engineering. One important area of measurement engineering is flow rate measurement engineering (see, the comprehensive treatment of Prof. Dr. sc. nat. Otto Fiedler "Flow and Flow Rate Measurement Engineering", R. Oldenbourg Verlag Munich 101992). Flow rate measurement according to mechanical action principles, especially variable-area flow meters and Coriolis flow meters, thermal flow meters, magnetic-inductive flow meters and ultrasonic flow meters are of special importance for flow rate measurement engineering (see, "Flow and Flow Rate Measurement Engineering", op. cit).

Ultrasonic flow meters use the effect that the transport velocity of a medium transported in a measurement tube is superimposed on the propagation velocity of the acoustic signal. The measured propagation velocity of the acoustic signal relative to the measurement tube is therefore greater than in a quiescent medium when the medium is being transported in the direction of the acoustic signal, and the velocity of the acoustic signal relative to the measurement tube is smaller than in the quiescent medium when the medium is being transported opposite the direction of the acoustic signal. The propagation time of the acoustic signal between the acoustic sender and the acoustic receiver—acoustic senders and acoustic receivers are ultrasonic transducers—based on the entrainment effect, is dependent on the transport velocity of the medium relative to the measurement tube, and thus, relative to the ultrasonic transducer, therefore relative to the acoustic sender and the acoustic receiver.

Otherwise, in the prior art underlying the invention, the ultrasonic transducer must be attached to a transducer holder using its housing flange. To do this, the housing flange is clamped between a holder flange of the transducer holder and an opposing flange, using retraining screws and lock nuts.

In particular, when the medium whose flow rate is to be measured has a high temperature, but mainly is under a high pressure, the attachment of the ultrasonic transducer to the transducer holder must meet high demands, in particular it must also be pressure-tight. As FIG. 1 shows, the opposing flange cannot be prevented from arching when the restraining screws are tightened, and as FIG. 1 likewise shows, the arching of the opposing flange likewise leads to an arching of the housing flange of the transducer housing. This is associated with a particular stressing of the housing flange of the transducer housing, but also a particular stress on the gasket which is located between the housing flange of the transducer housing and the holder flange of the transducer holder.

SUMMARY OF THE INVENTION

Consequently, a primary object of the present invention is to configure and develop the ultrasonic transducer underlying the invention such that the aforementioned problem no longer occurs.

The ultrasonic transducer in accordance with the invention in which the aforementioned object is achieved is, first of all, essentially wherein side of the housing flange of the transducer housing facing the opposing flange has an outer contour which allows bracing of the opposing flange without tilting of the housing flange. Therefore, in accordance with the invention, provision is made for an arching of the opposing flange which occurs when bracing the opposing flange against the housing flange of the transducer housing to be possible without the housing flange of the transducer housing "having to give way" to the opposing flange which is arching. In other words, therefore provision must be made for arching of the opposing flange which occurs when the opposing flange is braced against the housing flange of the transducer housing to be possible into a region in which there is no material from the housing flange of the transducer housing.

What was explained in general above can be implemented, in particular, by the side of the housing flange facing the opposing flange having a staggered or a beveled outer contour.

One embodiment of the ultrasonic transducer in accordance with the invention is especially advantageous in which the side housing flange of the transducer housing facing the opposing flange has a rounded outer contour. Preferably, the outer contour of the side of the housing flange facing the opposing flange has an outer contour with a radius of curvature which allows the opposing flange to roll off on the rounded outer contour of the housing flange.

In particular, at this point, there are various possibilities for embodying and developing the ultrasonic transducer in accordance with the invention. In this regard, reference is made to the exemplary embodiments which are described below in detail below in conjunction with the accompanying drawings.

DETAILED DESCRIPTION OF THE INVENTION

Figure 1:
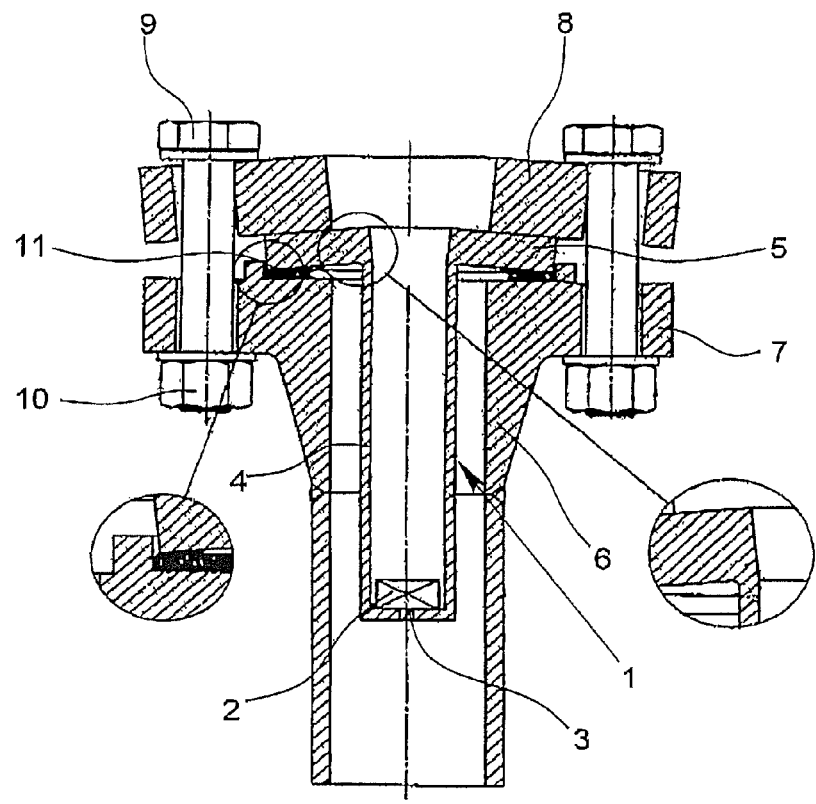
FIG. 1 is a cross-sectional view of a prior art ultrasonic transducer.

It applies to all described ultrasonic transducers that they each constitute an important part of an ultrasonic flow meter which is not otherwise described and have a transducer housing 1 and transducer element 2. The transducer housing 1 has an ultrasound window 3, a housing tube 4 and a housing flange 5.

In all of the ultrasonic transducers which are shown in the figures, the transducer element 2 is located on the end of the housing tube 4 facing the medium whose flow rate is to be measured. In contrast, it is possible for the transducer element 2 to be located on the end of the housing tube facing away from the medium whose flow rate is to be measured. This embodiment of an ultrasonic transducer in which the transducer element is located on the end of the housing tube facing away from the medium whose flow rate is to be measured is described, for example, in German Patent 198 12 458 and commonly owned, co-pending U.S. patent application claiming priority of German Patent Application 10 2013 001 351.8 of Jan. 28, 2013. For when and why such an embodiment is used, reference is made to the aforementioned document.

As all figures show, the ultrasonic transducer is attached to a transducer holder 6 using the housing flange 5. The housing flange 5 of the transducer housing 1 is clamped between a holder flange 7 of the transducer holder 6 and an opposing flange 8 using restraining screws 9 and lock nuts 10.

The problem underlying the invention can be taken from FIG. 1. Bracing the opposing flange 8 against the housing flange 5 of the transducer housing 1 using the retraining screws 9 and the lock nuts 10 causes arching of the opposing flange 8. The arching of the opposing flange 8 has also led directly to an arching of the housing flange 5 of the transducer housing 1. This results, as indicated in FIG. 1, in high stress on the housing flange 5 of the transducer housing 1, but also a high stress on a gasket 11 which is provided between the housing flange 5 of the transducer housing 1 and the holder flange 7 of the transducer holder 6.

At this point, in accordance with the invention, provision is made for the housing flange 5 of the transducer housing 1 to have an outer contour 12 on its side facing the opposing flange 8 which allows bracing of the opposing flange 8 without tilting of the housing flange 5.

Figure 2:
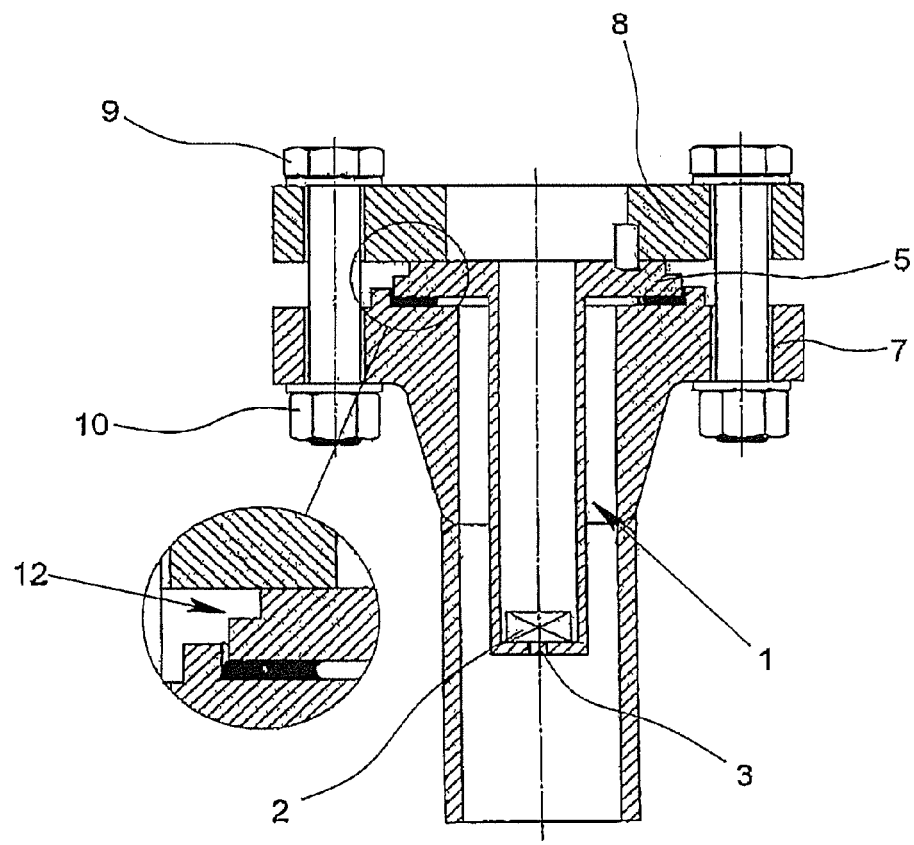
FIG. 2 is a cross-sectional view of a first exemplary embodiment of an ultrasonic transducer in accordance with the invention with an enlarged detail broken out.
Figure 3:
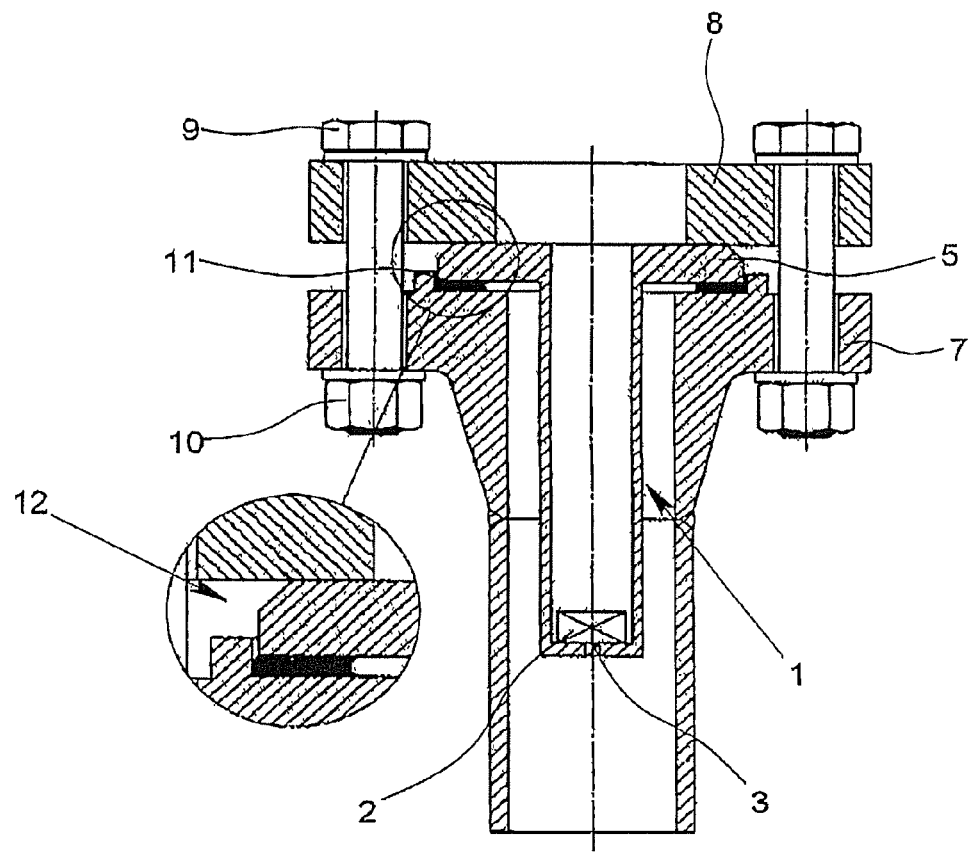
FIG. 3 is a cross-sectional view of a second exemplary embodiment of an ultrasonic transducer in accordance with the invention with an enlarged detail broken out.

According to the embodiment shown in FIG. 2, the housing flange 5 of the transducer housing 1 has a staggered outer contour 12 on its side facing the opposing flange 8. In the exemplary embodiment as shown in FIG. 3, the housing flange 5 of the transducer housing 1 has a beveled contour 12 on its side facing the opposing flange 8.

Figure 4:
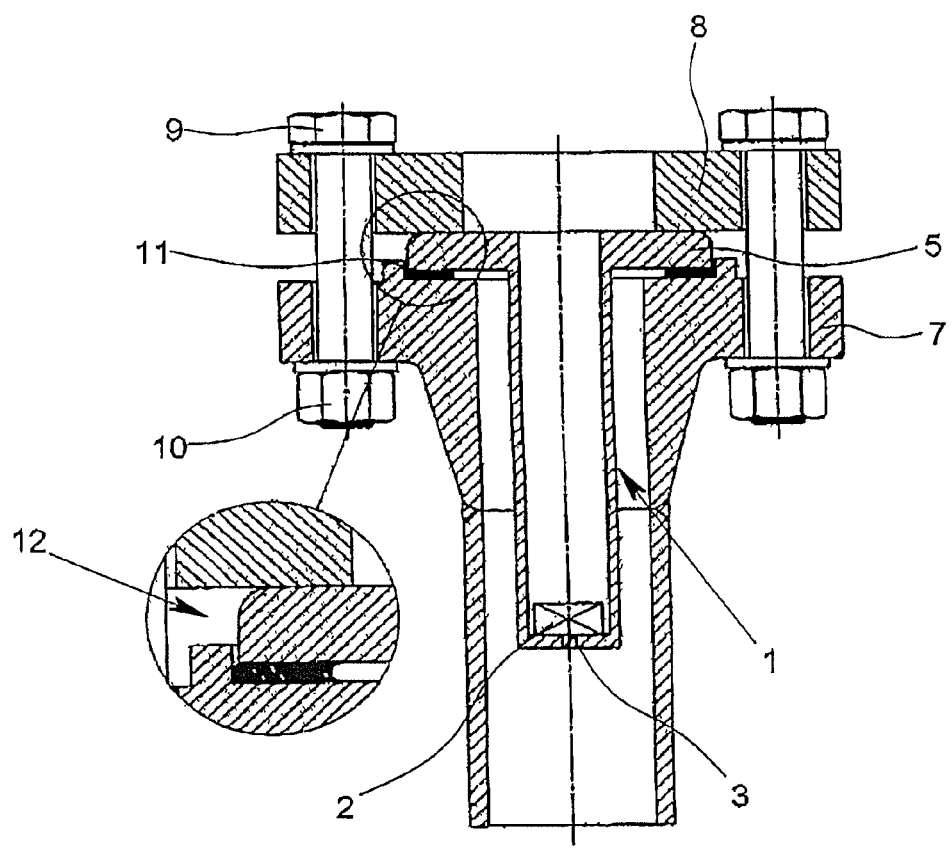
FIG. 4 is a cross-sectional view of a third preferred exemplary embodiment of an ultrasonic transducer in accordance with the invention with an enlarged detail broken out.
Figure 5:
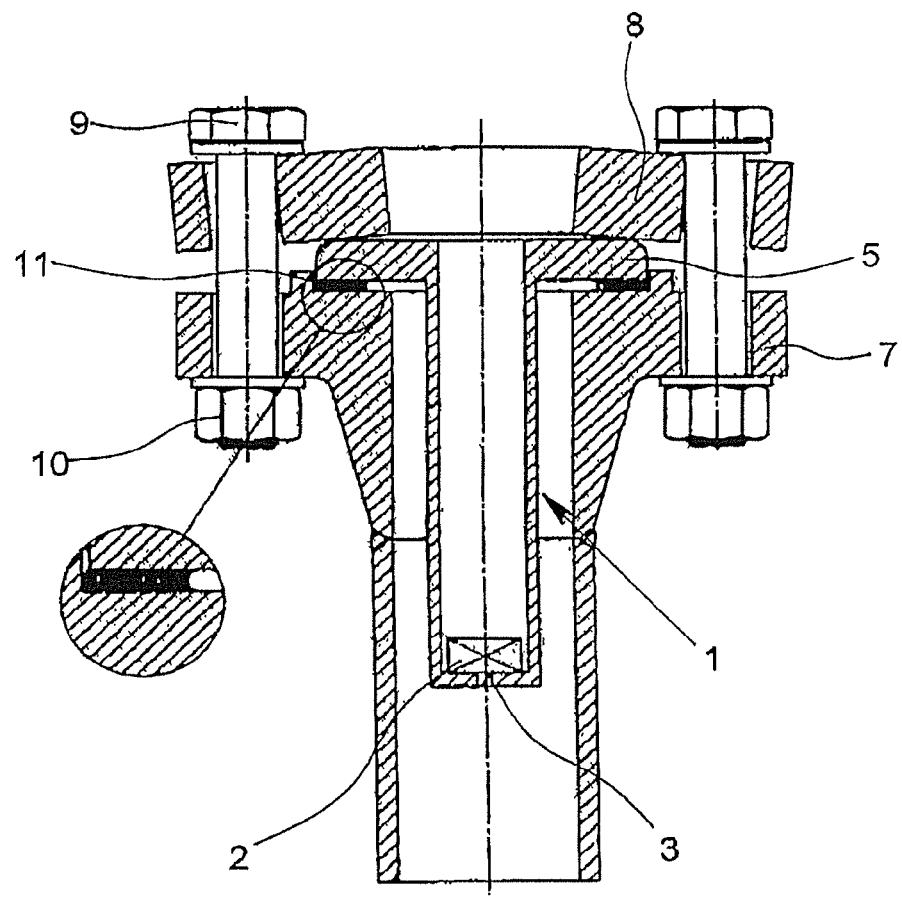
FIG. 5 is a cross-sectional view of showing the embodiment of FIG. 4 in a condition similar to that shown in FIG. 1 in which tightening of the retaining screws has produced arching of the opposing flange.

One especially preferred exemplary embodiment of the ultrasonic transducer in accordance with the invention is shown in FIGS. 4 & 5. In this exemplary embodiment, the side of the housing flange 5 facing the opposing flange 8 has a rounded outer contour 12. Here, the rounded outer contour 12 has a radius of curvature which allows the opposing flange 8 to roll off on the outer contour 12 of the housing flange 5.

If the exemplary embodiment of an ultrasonic transducer in accordance with the invention which is shown in FIGS. 4 & 5 is compared to the ultrasonic transducer which belongs to the prior art and which is shown in FIG. 1, it becomes immediately apparent what has been achieved in accordance with the invention. Specifically, not only is a particular stress on the housing flange 5 of the transducer housing prevented, but also prevented is a particular stress on the gasket 11 which is provided between the housing flange 5 of the transducer housing and the holder flange 7 of the transducer holder 6.

What is claimed is:

1. An ultrasonic transducer assembly, comprising:
a transducer housing having an ultrasound window, a housing tube and a housing flange,
a transducer holder for holding the transducer housing,
a transducer element that is positioned at an end of the housing tube of the transducer housing, and
an opposing flange clamping the housing flange of the transducer housing to a holder flange of the transducer holder together with retraining screws and lock nuts,
wherein the side of the housing flange of the transducer housing facing the opposing flange has an outer contour which enables bracing of the opposing flange against the housing flange without tilting or bending of the housing flange.

2. The ultrasonic transducer assembly in accordance with claim 1, wherein the side of the housing flange of the transducer housing facing the opposing flange has a staggered outer contour.

3. The ultrasonic transducer assembly in accordance with claim 1, wherein the side of the housing flange of the transducer housing facing the opposing flange has a beveled outer contour.

4. The ultrasonic transducer assembly in accordance with claim 1, wherein the side of the housing flange of the transducer housing facing the opposing flange has a rounded outer contour.

5. The ultrasonic transducer assembly in accordance with claim 4, wherein the rounded outer contour of the housing flange has a radius of curvature which enables the opposing flange to roll off on the outer contour of the housing flange.

* * * * *